United States Patent [19]
Lutz

[11] Patent Number: 5,522,494
[45] Date of Patent: Jun. 4, 1996

[54] RECIPROCATING SLAT CONVEYOR

[76] Inventor: David E. Lutz, 20 Wolfbridge Rd., Carlisle, Pa. 17013

[21] Appl. No.: 329,297

[22] Filed: Oct. 26, 1994

Related U.S. Application Data

[62] Division of Ser. No. 223,860, Apr. 6, 1994, Pat. No. 5,402,878.

[51] Int. Cl.⁶ .................................................. B65G 25/04
[52] U.S. Cl. ...................................... 198/750.3; 198/750.5
[58] Field of Search ........................... 198/750.2, 750.3, 198/750.5, 750.6; 414/525.1

[56] References Cited

U.S. PATENT DOCUMENTS

| | | |
|---|---|---|
| 2,218,121 | 10/1940 | Paiement . |
| 2,298,982 | 10/1942 | Smith . |
| 2,679,941 | 6/1954 | Roesies . |
| 2,973,856 | 3/1961 | Brooks . |
| 3,722,717 | 3/1973 | Stryczek . |
| 3,865,260 | 2/1975 | Wieschel et al. . |
| 4,015,727 | 4/1977 | Rezac . |
| 4,082,196 | 4/1978 | Lutz et al. . |
| 4,111,318 | 9/1978 | Lutz . |
| 4,113,122 | 9/1978 | Lutz . |
| 4,309,141 | 1/1982 | Van Drie . |
| 4,927,316 | 5/1990 | Kordel . |
| 5,009,564 | 4/1991 | Lutz et al. . |
| 5,125,502 | 6/1992 | Foster . |
| 5,143,508 | 9/1992 | Lutz et al. . |
| 5,222,590 | 6/1993 | Quaeck . |
| 5,325,957 | 7/1994 | Wilkens ............................ 198/750.2 |

FOREIGN PATENT DOCUMENTS

| | | |
|---|---|---|
| 61-196835 | 9/1986 | Japan . |
| 1437307 | 11/1988 | U.S.S.R. . |

*Primary Examiner*—D. Glenn Dayoan
*Attorney, Agent, or Firm*—Thomas Hooker

[57] ABSTRACT

A reciprocating slat conveyor for loading and unloading a bulk cargo from a stationary or movable receptacle includes a plurality of elongate slats arranged side-by-side along the bottom of the receptacle and grouped into three slat sets each set movable along the bottom of the receptacle. The conveyor includes three cross members each attached to a respective slat set. The cross members and slats are moved by a slat drive which simultaneously moves all slats and cross members in a first direction and then moves the slat sets and cross members in a second direction, opposite the first direction, one cross member and slat set at a time. An angled bulkhead overlies the cross members and drive and shields the member and drive from the contents of the receptacle.

14 Claims, 14 Drawing Sheets

RECIPROCATING SLAT CONVEYOR

This is a divisional of application Ser. No. 08/223,860 filed on Apr. 06, 1994 now U.S. Pat. No. 5,402,878.

FIELD OF THE INVENTION

The invention relates to reciprocating slat conveyors for loading bulk cargo into a stationary or movable receptacle or unloading the cargo from the receptacle and, more particularly, to reciprocating slat conveyors having a number of sets of slats where a hydraulic drive simultaneously moves the sets of slats in a first direction to load or unload the bulk cargo and sequentially moves the sets of slats in a second direction, one set at a time, to return the slats for the next simultaneous movement in the first direction.

DESCRIPTION OF THE PRIOR ART

Conventional reciprocating slat conveyors are used for loading and unloading receptacles with bulk cargo such as undifferentiated garbage, fertilizer, wood chips, saw dust and the like. The receptacles may be mobile or fixed in place and include a flat reciprocating slat floor, sidewalls, a front wall and an open discharge end opposite the front wall. The conveyor floor includes sets of slats with the individual slats in each set spaced across the width of the receptacle. The slats in each set are joined to a cross member extending across the width of the floor. A hydraulic slat drive includes a separate hydraulic cylinder for each set of slats with each cylinder connected to the receptacle and to one of the cross members. Controlled extension and retraction of the three cylinders moves the slats longitudinally along the length of the floor. The cylinders may be actuated to move all of the slats simultaneously toward the front wall during loading of the receptacle or to move all of the slats simultaneously toward the discharge end of the receptacle during discharge of cargo from the receptacle. Individual cylinders are actuated sequentially to retract single sets of slats back to a start position. Upon retraction of all three sets of slats, the drive is again actuated to move all slats together along a drive stroke.

SUMMARY OF THE INVENTION

The invention is an improved reciprocating slat conveyor having a two cylinder hydraulic slat drive for moving three sets of slats to load or unload a bulk cargo from a receptacle. The slat conveyor includes three sets of longitudinally extending slats spaced across the width of the receptacle floor with three cross members each secured to a set of slats. One cross member is located between the other two cross members. A first drive cylinder is connected between the middle cross member and the receptacle and a second drive cylinder is connected between the two end cross members located to the front and rear of the middle cross member. Selective extension and retraction of the two cylinders moves the three sets of slats back and forth along the length of the floor of the receptacle to load or unload bulk cargo.

The improved reciprocating slat conveyor is reliable, lighter than the conventional conveyors using three cylinder drives and is less complicated than conventional slat conveyors.

The conveyor includes a bulkhead which angles upwardly from the rearmost cross member to a vertical wall at the front end of the receptacle. The bulkhead overlies the front ends of the slats, the cross members and the connections between the drive cylinders and the cross members. In a first embodiment shown in FIG. 2 the bulkhead is joined to a fixed front wall and includes a lower end which has a sliding engagement with a cover-plate joined to the rearmost cross member and extending forwardly from such cross member over the drive connections. In a second embodiment shown in FIG. 9 the bulkhead and wall are movable with the rearmost cross member. The lower end of the bulkhead is joined directly to the rearmost cross member and the upper end of the bulkhead is joined to a movable front wall. The bulkhead and front wall form a unit movable together with the cross member and close the front of the receptacle.

In both embodiments, the bulkhead is flat and angles up from the rearmost cross member to the front wall. The bulkhead prevents the contents of the receptacle from falling down into the space adjacent the cross members and slat drive. An inspection door is provided in the bulkhead.

Other objects and features of the invention will become apparent as the description proceeds, especially when taken in conjunction with the accompanying drawings illustrating the invention, of which there are 14 sheets and six embodiments.

DESCRIPTION OF THE PREFERRED EMBODIMENTS

First Preferred Embodiment of the Invention

Figure 1:
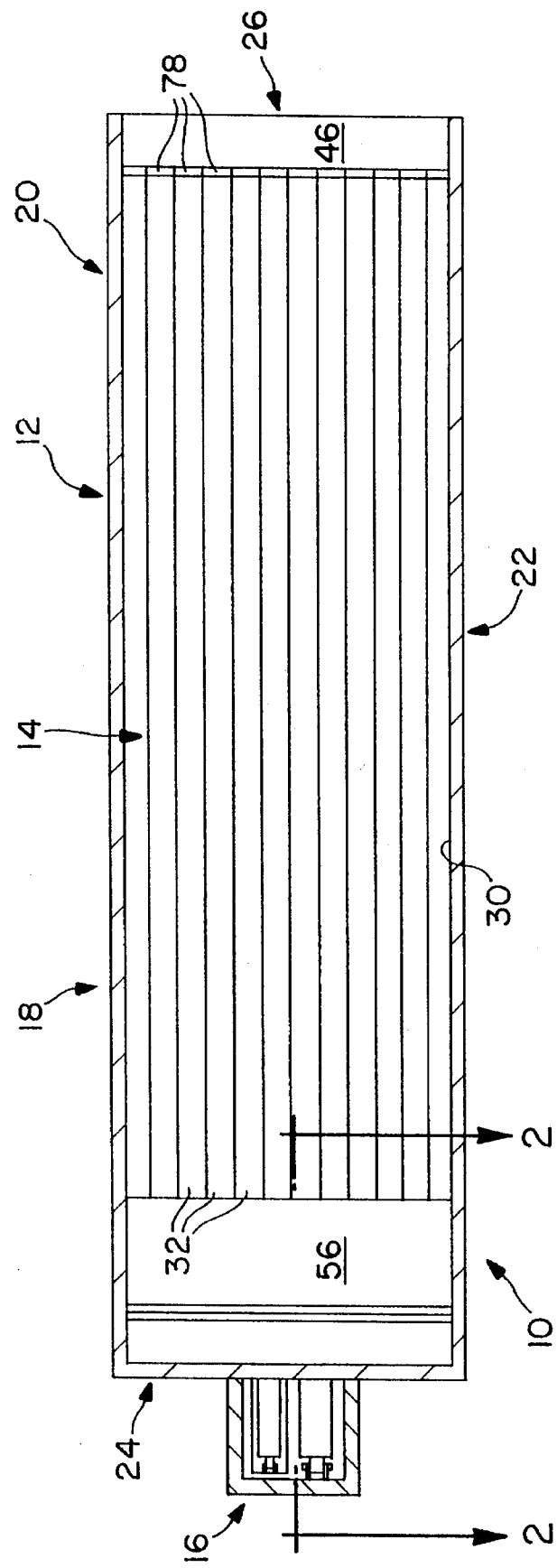
FIG. 1 is a longitudinal sectional view taken through a cargo-carrying receptacle with a first embodiment reciprocating slat conveyor according to the invention.

FIGS. 1 through 6c illustrate a first preferred embodiment of the invention. Reciprocating slat conveyor 10 includes a cargo receptacle 12 having a load supporting floor 14. The slats in the support floor are movable back and forth longitudinally within the receptacle by two cylinder hydraulic drive 16.

The receptacle 12 includes a rectangular parallelepiped body 18 having elongate right and left sidewalls 20 and 22, front wall 24, and an open rear discharge end 26. The load support floor 14 rests on transverse support beams 28 extending across the width of the bottom of body 18 between sidewalls 20 and 22. The support floor, sidewalls and front wall define a cargo receiving compartment 30.

Figure 3:
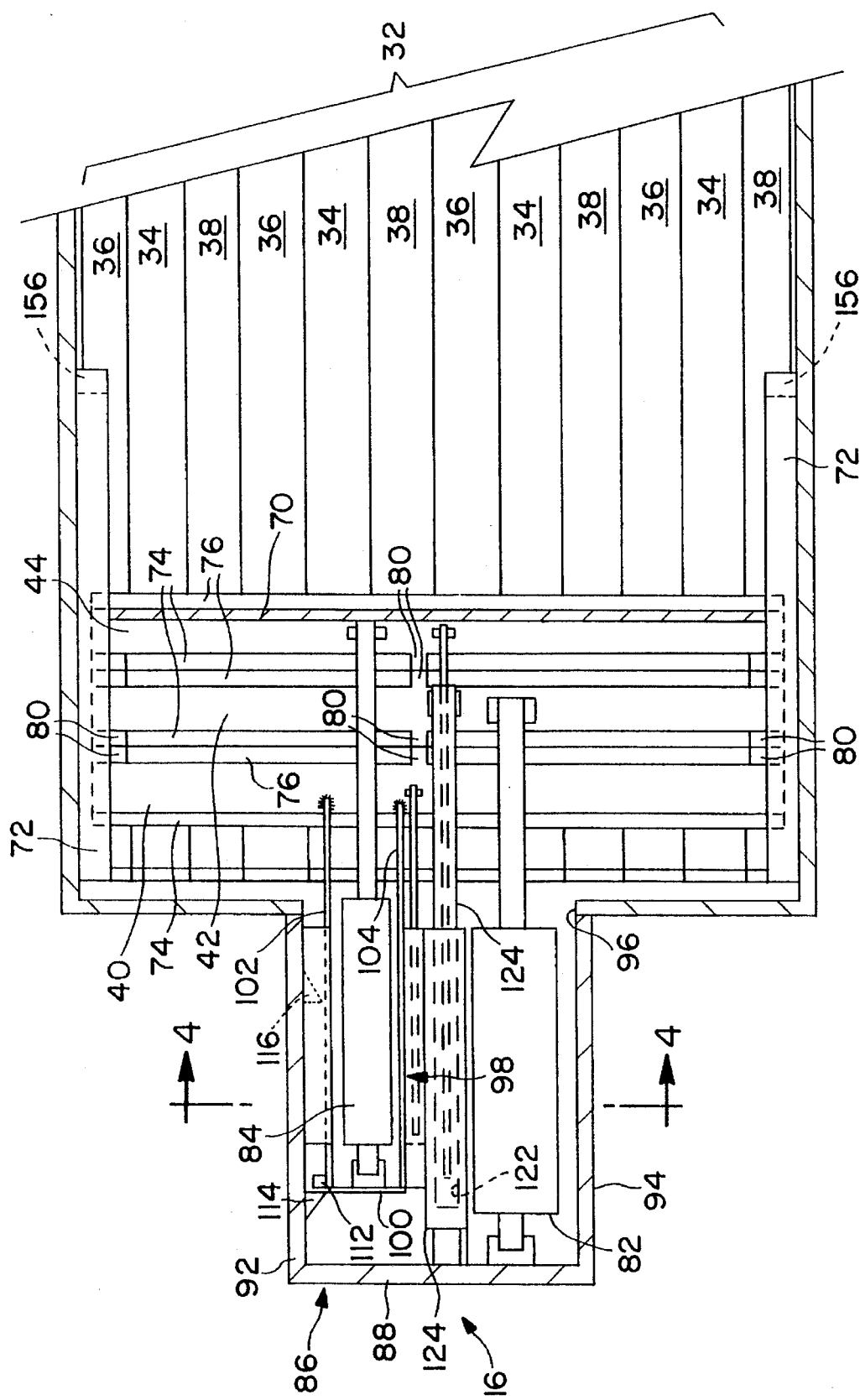
FIG. 3 is an enlarged view of the front of the receptacle shown in FIG. 1 with the bulkhead removed.

The support floor 14 comprises a number of like elongate load support slats 32 spaced side-by-side across the width of the floor. The parallel slats extend along the longitudinal length of the floor between the front and rear ends of the receptacle body to support a load in compartment 30. Drive 16 moves the slats longitudinally back and forth between the rear discharge end and front end of body 18. The slats are grouped into three spaced movable slat sets 34, 36 and 38 as indicated in FIG. 3. The slats in each slat set are moved together by drive 16.

Front cross member 40, middle cross member 42 and rear cross member 44 rest on the tops of the front ends of the slats and extend across the width of receptacle compartment 30. Each cross member is connected to a set of slats to be moved longitudinally by drive 16. Cross member 40 is connected to a set of slats 34, cross member 42 is connected to a set of slats 36 and cross member 44 is connected to a set of slats 38. The drive is connected to the cross members and simultaneously moves the cross members and the three sets of slats toward the rear discharge end 26 during a discharge stroke to move the cargo resting on the slats rearward a distance equal to the length of the discharge stroke. Upon completion of the discharge stroke, the drive sequentially moves or retracts the sets of slats forward by moving one slat set at a time toward the front of the compartment so that the slats are repositioned to the front of the receptacle compartment without moving the cargo forward. The withdrawal stroke distance is equal to the discharge stroke distance. The drive is reversible so that the conveyor moves a load from the discharge end toward the front wall 24 during loading of the receptacle.

Receptacle 12 includes short floor panel 46 at the discharge end of body 18 below the rear ends of slats 32. Panel 46 extends across the width of the floor. The ends of the slats at the rear of the receptacle move back and forth across the top of the floor panel during extension and retraction strokes. The short floor panel supports cargo in the compartment when the slats are withdrawn to the forward position shown in FIG. 1.

A plurality of spaced transverse support beams 28 are connected to sidewalls 20 and 22 and support elongate slats 32. The slats 32 may be made of metal or plastic and have flat top and bottom surfaces. Each support beam has an I-shaped cross section with upper and lower horizontal flanges 48 joined to a vertical web 50. The slats 32 rest on upper flanges 48.

Figure 2:
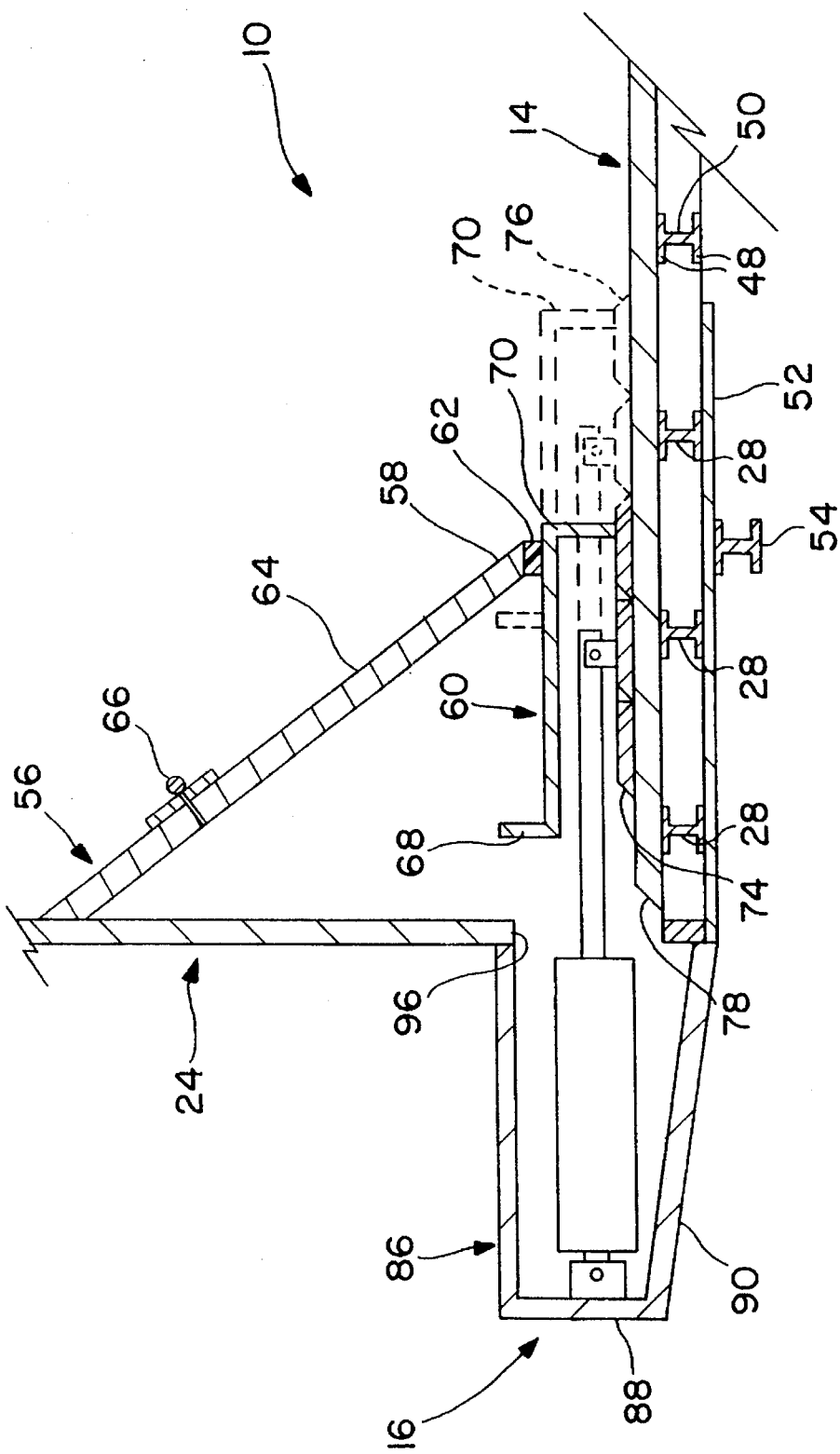
FIG. 2 is a sectional view taken along line 2—2 of FIG. 1.

Receptacle 12 may be a semi-truck trailer or may be stationary. In the event the receptacle is a trailer, a base plate 52 is connected to the bottom of front wall 24 and the lower flanges of support beams 28 at the front of the body as shown in FIG. 2. A hook-up pin 54 is secured to the bottom of the baseplate and is adapted to connect the trailer to a conventional fifth wheel on the chassis of the truck for moving the trailer. A wheel assembly for the trailer (not illustrated) is provided.

Diagonal bulkhead 56 extends across the width of the receptacle body 18 and downwardly from the front wall 24 into compartment 30. The upper end of the bulkhead is secured to the interior of front wall 24 and lower end 58 is located directly above movable coverplate 60. A plastic wear member 62 is secured to the lower bulkhead end 58 and rests on top of the coverplate to limit cargo in the compartment from passing between the lower end and the coverplate and accumulating under the bulkhead. The bulkhead extends across the width of the compartment. The sides of the bulkhead are fixed to the receptacle sidewalls. The bulkhead includes an access door 64 which is rotatable about hinge 66 to permit easy access to the area under the bulkhead for inspection and cleaning as required. Plastic wear members (not illustrated) like wear member 62 may be mounted on the side edges of the door and engage the sidewalls to limit cargo in the compartment 30 from accumulating under the bulkhead. When it is necessary to gain access to the area behind the bulkhead, door 64 is rotated counterclockwise about hinge 66. The door is closed by rotating the door clockwise until wear member 62 engages the top of coverplate 60.

The essentially flat rectangular coverplate 60 overlies cross members 40, 42 and 44. The coverplate includes an upwardly extending front flange 68 extending across the front edge of the plate and a downwardly extending rear flange 70 extending across rear plate edge. The coverplate and flanges extend across the width of the cargo receptacle below bulkhead 56 and above the cross members. The lower end of rear flange 70 is connected to the top of rear cross member 44 so that the coverplate moves longitudinally with the cross member. The sides of the coverplate may be slidably supported by projections on the sidewalls 20 and 22. Drive 16 moves the cross member 44 from a location under the bulkhead to a location to the rear of the bulkhead, as shown in dashed lines in FIG. 2. The coverplate shields the cross members from the cargo within the compartment 30. During operation of the conveyor, cargo may find its way past the bulkhead and fall onto coverplate 60. The upwardly extending front flange 68 helps retain cargo on the coverplate so that it does not fall onto the cross members and drive. Door 64 may be opened to permit removal of cargo collected on coverplate 60 and cargo which may have fallen from the coverplate onto the cross members and drive.

Cross members 40, 42 and 44 are preferably made of metal. The cross members rest on the tops of the front ends of the slats and extend across the width of the compartment. The ends of the cross members extend below longitudinally extending hold down ribs 72, which are attached to the interior sides of walls 20 and 22. The ribs permit longitudinal movement of the cross members and prevent upward rotation or tilting of the cross members as a result of torque which is exerted on the members by the slat drive 16. Each cross member is firmly attached to a set of slats by conventional fastening members (not illustrated) which may be bolts, rivets or the like. The attachment prevents longitudinal shifting of the cross members relative to the slats while permitting limited lateral shifting of the cross members relative to the slats. Upwardly extending projections may be provided on tops of the cross member ends adjacent the edges of hold down ribs 72 to limit lateral shifting of the cross members.

Each cross member has a front bevel edge 74 facing front wall 24 and a rear bevel edge 76 facing the open rear discharge end. Bevel edges 78 are provided at the front and rear ends of the slats. During use of the conveyor, plastic wear member 62 may wear and permit fine cargo material to move past the bulkhead and onto the coverplate. This material may fall onto and accumulate on the cross members. Bevel edges 74 and 76 assure that any fine material which accumulates on the tops of the cross members does not collect between the cross members and limit the movement of the cross members. Bevel edges 78 facilitate movement of the ends of the slats.

Three spaced drive abutments 80 are spaced along the length of the rear edge of front cross member 40, along the front and rear edges of middle cross member 42 and along the front edge of rear cross member 44. The drive abutments have the same thickness as the cross members and provide contact surfaces for engaging adjacent abutments and moving adjacent cross members. The remainder of the edges of the cross members are beveled. The abutments are located at both ends and at the middle of the cross members so that each abutment engages a complimentary abutment at the same location on the edge of the next adjacent cross member. As shown in FIG. 3, abutments on the rear edge of front cross member 40 engage abutments on the front edge of middle cross member 42 and abutments on the front edge of rear cross member 44 engage abutments on the rear edge of middle cross member 42.

Slat drive 16 includes a pair of hydraulic drive cylinders 82 and 84. Large diameter hydraulic drive cylinder 82 has a volumetric capacity approximately twice as great as the volumetric capacity of small diameter cylinder 84 and moves all the slats together during a feed stroke. The drive cylinders are enclosed in cylinder housing 86 mounted on the front of receptacle front wall 24 as shown in FIG. 3. The housing includes front wall 88, downwardly sloped floor 90, and right and left housing walls 92 and 94 which extend between housing front wall 88 and receptacle body front wall 24. The housing has an open rear end which is aligned with an opening 96 at the bottom of front wall 24 to permit extension and retraction of the cylinders through front wall 24.

The body of cylinder 82 is mounted on wall 88 and the piston rod of cylinder 82 is connected to a bracket mounted on the top of the middle cross ember 42. Extension and retraction of the large drive cylinder 82 moves middle cross member 42 rearwardly and forwardly, respectively.

A three sided frame 98 surrounds the small hydraulic drive cylinder 84 and includes a front wall 100 and elongate right and left side walls 102 and 104 which extend to the top of the front cross member 40. The lower edges of the rear ends of walls 102 and 104 are welded or otherwise secured to the top of cross member 40 so that the frame is movable forwardly and rearwardly with the cross member. The bottom edges of the front wall and right and left bracket sidewalls slidably engage the top of tray 106 which is supported by floor 90. The top edges of the sidewalls 102 and 104 slidably engage hold down flanges 108 mounted on sidewall 92 and torsion control device 110. See FIG. 4.

Extension and retraction of cylinder 84 may move the frame 98 longitudinally between the tray and the hold down flanges. The body of small drive cylinder 84 is connected to the frame front wall 100 as shown in FIG. 3. The piston rod of the cylinder extends through the open end of the frame and is connected to the top of rear cross member 44. Cylinder 84 joins the front and rear cross members 40 and 44. Extension and retraction of small cylinder 84 moves the cross members 40 and 44 apart and together, respectively. See FIGS. 6a and 6c.

An abutment 112 projects outward of frame sidewall 102 and is movable with the frame. The abutment engages spaced fixed front and rear stop members 114 and 116 which are mounted on the interior of right housing sidewall 92 and extend inwardly to engage the abutment. The front and rear stop members are separated by a distance equal to the stroke of cylinder 84.

Figure 4:
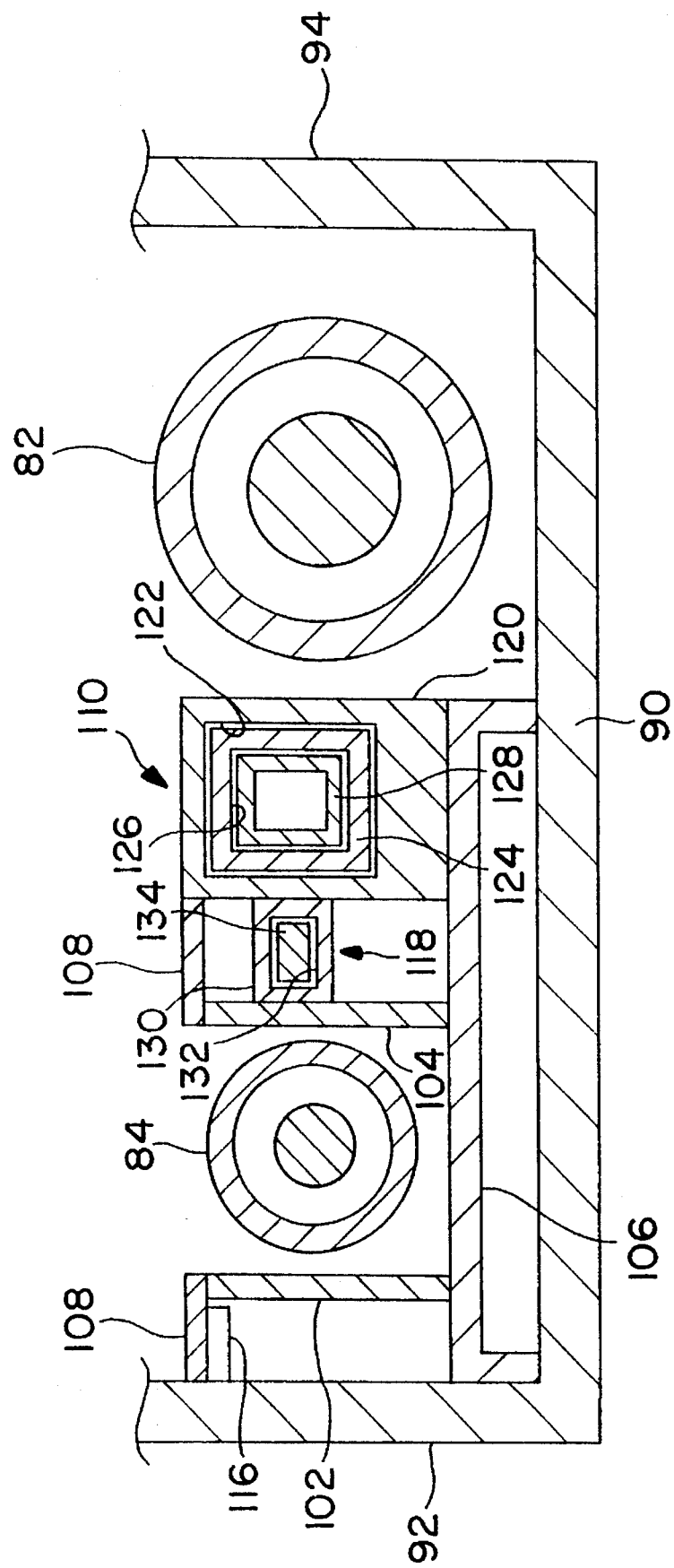
FIG. 4 is a sectional view taken along line 4—4 of FIG. 3.

Torsion control devices 110 and 118 shown in FIGS. 3 and 4 prevent twisting of the cross members during movement of the slats. Device 110 includes a longitudinally extending outer sleeve 120 fixedly mounted on tray 106 and connected to housing front wall 88 at the front of the sleeve. The sleeve defines a rectangular interior opening 122 which extends along the length of sleeve 120 as shown in FIG. 3. The opening slidably receives a first inner sleeve 124 which has a front end that extends into the opening and a rear end that extends outwardly from sleeve 120, through opening 96 and is connected to the top of middle cross member 42. The first inner sleeve 124 defines elongate interior opening 126 which slidably receives elongate second inner sleeve 128. The front end of the second inner sleeve extends into the opening 126 and the rear end of the inner sleeve 128 extends outwardly of sleeve 124 and is connected to the top of rear cross member 44. The sleeves may be lubricated at sliding interfaces.

Torsion control device 118 includes an elongate rectangular sleeve 130 which is connected to the side of outer sleeve 120 adjacent left bracket sidewall 104 and below hold down flange 108 as shown in FIG. 4. The elongate sleeve defines an elongate interior opening 132 similar to openings 122 and 126 which opens through the rear end of the sleeve. The front end of bar 134 extends into opening 132 and the rear end of the bar extends rearwardly of the sleeve 130 and is connected to the top of front cross member 40. The bar 134, first inner sleeve 124 and second inner sleeve 128 are extended and retracted as the respective cross members are moved rearwardly and forwardly during the operation of the conveyor. The bar 134 prevents twisting of front cross member 40, and the first and second sleeves 124 and 128 prevent twisting of cross members 42 and 44, respectively. Device 118 may also be lubricated.

Figure 5:
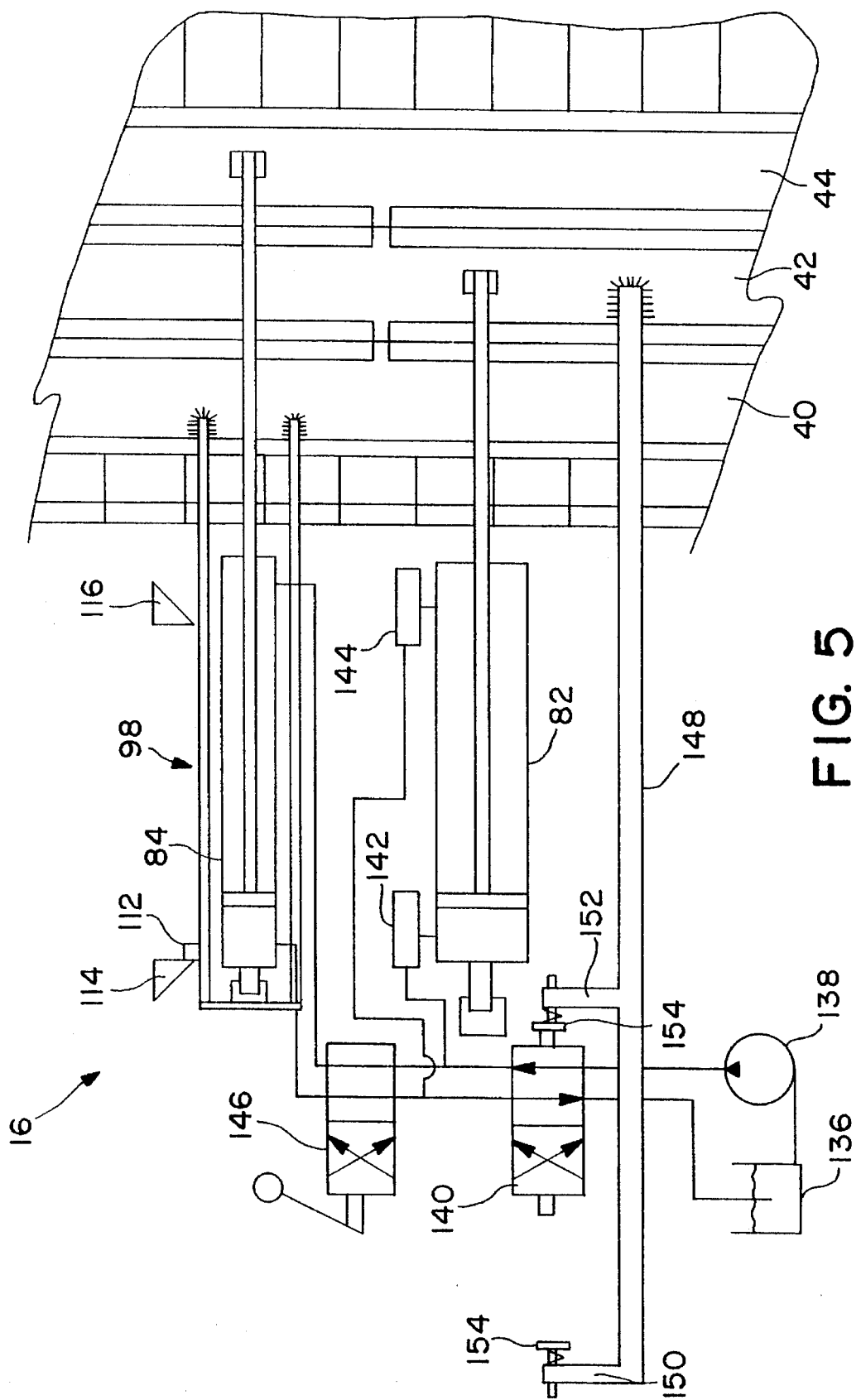
FIG. 5 is a diagrammatic view illustrating the hydraulic drive for the reciprocating slat conveyor.

The hydraulic circuit for slat drive 16 is shown in FIG. 5 and includes a hydraulic fluid reservoir 136, hydraulic fluid pump 138 which may be powered by the engine of a truck attached to cargo receptacle 12 to provide a constant volume flow of hydraulic fluid, reversing valve 140, sequencing pressure valves 142 and 144 and flow reversing valve 146 together with hydraulic fluid lines as illustrated. The fluid lines connect the pump 138 to cylinders 82 and 84 and fluid reservoir 136. Sequencing valves 142 and 144 permit high pressure hydraulic fluid only to flow into the body of cylinder 82. The valves permit free flow of fluid from the cylinder body.

With valves 140 and 146 in the positions shown in FIG. 5, the output of pump 138 is connected to the front end of the body of cylinder 82 through pressure valve 142 and to the rear end of the body of cylinder 84 through flow valve 146. The front end of the body of cylinder 84 is connected to the reservoir 136 through valves 146 and 140 and the rear end of the body of cylinder 82 is connected to the reservoir through pressure valve 144 and valve 140. Shifting of the reversing valve 140 connects the output of pump 138 to the rear end of the body of valve 82 through pressure valve 144 and to the front end of the body of valve 84 through valve 146. In this position of reversing valve 140, the rear end of the body of cylinder 84 is connected to the reservoir 136 through valves 146 and 140 and the front end of the body of cylinder 82 is connected to the reservoir through pressure valve 142 and valve 140.

Elongate shift rod 148 has a rear end connected to middle cross member 42 and a front end located forward of the cross members. Spaced laterally extending arms 150 and 152 are provided on the front end of the rod with arm 150 located in front of valve 140 and arm 152 located behind valve 140. Inwardly facing spring backed contact pads 154 are mounted on the ends of arms 150 and 152 to intermittently engage the ends of the spool of reversing valve 140 to shift the spool and thereby reverse the flow direction of the hydraulic fluid through the hydraulic circuit. Reversing valve 140 is mounted in a fixed position on receptacle 12 between arms 150 and 152. The contact pad 154 mounted on the front arm 150 engages the spool of the reversing valve just before the cylinder 82 is fully extended and contact pad 154 on arm 152 engages the spool of the reversing valve just before cylinder 82 is fully retracted.

When valve 146 is in the position of FIG. 5, conveyor 10 operates to move cargo in the receptacle toward the rear discharge end 26. When the valve is manually shifted to the alternate position, the conveyor operates to move the cargo toward the front wall 24.

The cycle of operation of the reciprocating slat conveyor 10 during unloading of material from receptacle 12 will now be described. Valve 146 is in the position shown in FIG. 5. At the start of the cycle, cylinders 82 and 84 are retracted and the cross members and slats are fully retracted. The cross members abut each other. See FIG. 5.

The cycle of operation of the conveyor begins by pump 138 flowing hydraulic fluid through valves 140 and 146 to the rear end of the body of cylinder 84. Because the cylinder is fully retracted, pressure builds to a sufficient level to flow hydraulic fluid past pressure sequencing valve 142 and into the front end of the body of cylinder 82 to extend the large diameter drive cylinder and move attached cross member 42 rearwardly away from the front of the receptacle. During rearward movement of the cross member 42, the high pressure hydraulic fluid retains cylinder 84 in the retracted position as shown in FIG. 5. Movement of cross member 42 rearwardly moves cross member 44 rearwardly. Movement of cross member 44 moves cylinder 84 and frame 98 rearwardly so that cross member 40 is also moved rearwardly with cross member 44. During this movement, the cylinder 84 and frame 98 join the two cross members 44 and 40 together for rearward movement with cross member 42. Cross member 42 is moved into abutment with stationary stops 156 which limit further rearward movement of the member. The stops extend down from the rear end of ribs 72 and contact the downstream edge of member 42. See FIG. 3.

Figure 6A:
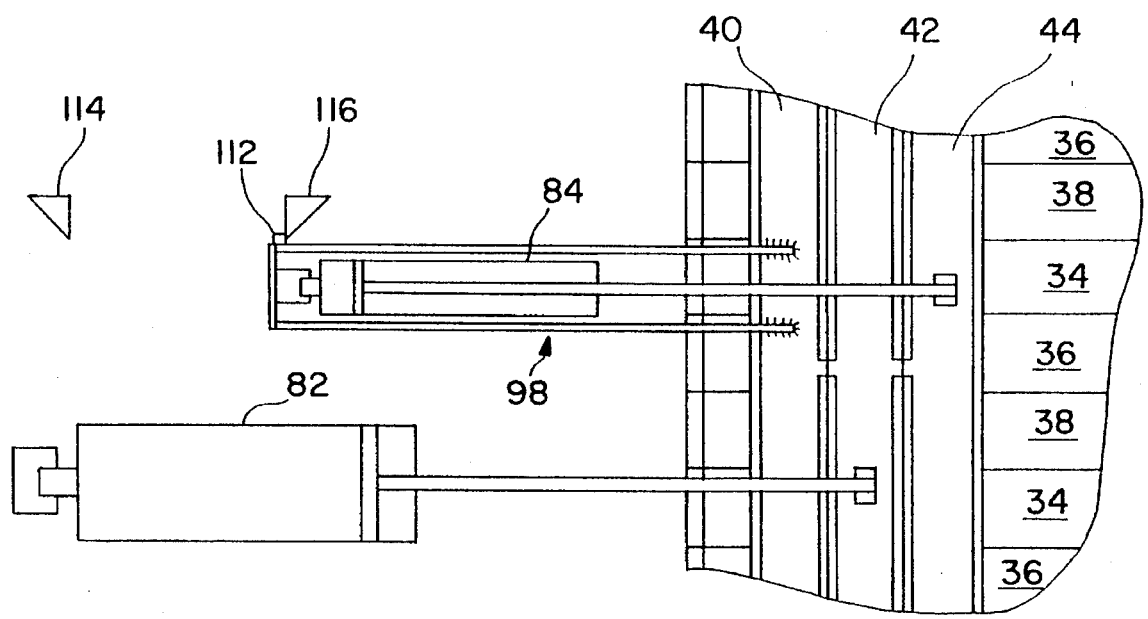
FIGS. 6a, 6b and 6c are top views illustrating the sequence of operation of the hydraulic drive.

The slats 34, 36 and 38 attached to the three cross members all move rearwardly with extension of cylinder 82 to move the load in the receptacle 12 toward the rear discharge end 26. When cylinder 82 is moved to the end of its stroke, abutment 112 on frame 98 engages rear stop 116. This position is illustrated in FIG. 6a. All of the slats have been moved together toward the rear of the receptacle at the same speed to assure rearward movement of the cargo.

When the drive has moved to the position of FIG. 6a, and drive cylinder 82 is fully extended, the pad 154 on arm 150 engages an end of the spool of reversing valve 140 to shift the valve and connect the output of pump 138 to the front end of the body of cylinder 84 through valve 146 and to the rear end of the body of cylinder 82 through sequencing valve 144. The pump initially flows hydraulic fluid into the front end of the body of cylinder 84 to extend the cylinder from the position of FIG. 6a to the position of FIG. 6b. Extension of cylinder 84 separates the front and rear cross members 40 and 44 and moves or retracts the front cross member 40, and the attached set of slats 34, toward the front of the receptacle 12 to the position shown in FIG. 6b. During forward movement of slats 34, the cargo on the floor of the receptacle is held stationary on two sets of stationary slats 36 and 38. Stops 156 assure member 40 moves forwardly during extension of the small diameter cylinder 84.

Cylinder 84 is extended until abutment 112 engages front stop 114. The pressure of hydraulic fluid then increases and opens pressure sequencing valve 144 and hydraulic fluid flows into the rear end of the body of cylinder 82 to retract cylinder 82 and move the middle cross member 42 and attached slats 36 toward the front of the receptacle 12 to the position of FIG. 6c. During forward movement of slats 36, slats 34 and 38 are stationary so that the cargo in the receptacle is not moved.

When cylinder 82 is fully retracted, arm 152 engages the spool of reversing valve 140 to reshift the valve to the position shown in FIG. 5. Shifting of the valve 140 flows hydraulic fluid from pump 138 to the rear end of the body of cylinder 84 to retract the cylinder and move the downstream cross member 44 and attached slats 38 from the position of FIG. 6c to the position of FIG. 5, thus returning all of the slats to the forward or retracted position. During forward or retracted movement of slats 38, the cargo remains stationary in the receptacle on stationary slats 34 and 36. Further, cross member 40 is held stationary against cross member 42 which, in turn, is held stationary by cylinder 82, thereby assuring that retraction of cylinder 84 moves cross member 44, and attached slats 38, in a forward direction.

When all of the slats have been moved to the position shown in FIG. 5, cylinder 84 is fully retracted, abutment 112 engages forward stop member 114 and the pressure of the hydraulic fluid builds to open sequencing valve 142 to extend the large diameter drive cylinder 82 and initiate the next cycle of operation of conveyor 10. The two cylinder drive 16 continues to cycle and move the three cross members and attached slats rearwardly and forwardly as described to move the cargo in receptacle 12 rearwardly for discharge out of the discharge end 26 of the receptacle.

The operation of slat conveyor 10 has been described with flow reversing valve 146 in the position shown in FIG. 5 so that the conveyor operates to unload a cargo rearwardly from the front wall of the receptacle toward the rear discharge end of the receptacle. Valve 146 may be shifted to the alternative position indicated in FIG. 5 so that the drive moves the slats in unison toward the front end of the receptacle and then moves individual sets of slats back toward the rear of the receptacle one set at a time.

The loading cycle of operation of the reciprocating slat conveyor 10 will be described starting from the position shown in FIG. 5, with valve 146 shifted to the alternate position. Hydraulic fluid from pump 138 is flowed to the front end of the body of cylinder 84 to extend the cylinder. Abutment 112 engages front stop 114 to prevent forward movement of the cylinder and attached cross member 40. Extension of the cylinder moves the rear cross member 44, and attached slats 38, rearwardly to the position of FIG. 6c. Cross members 40 and 42, and attached slats 34 and 36, are held stationary so that the load is not moved.

Figure 6B:
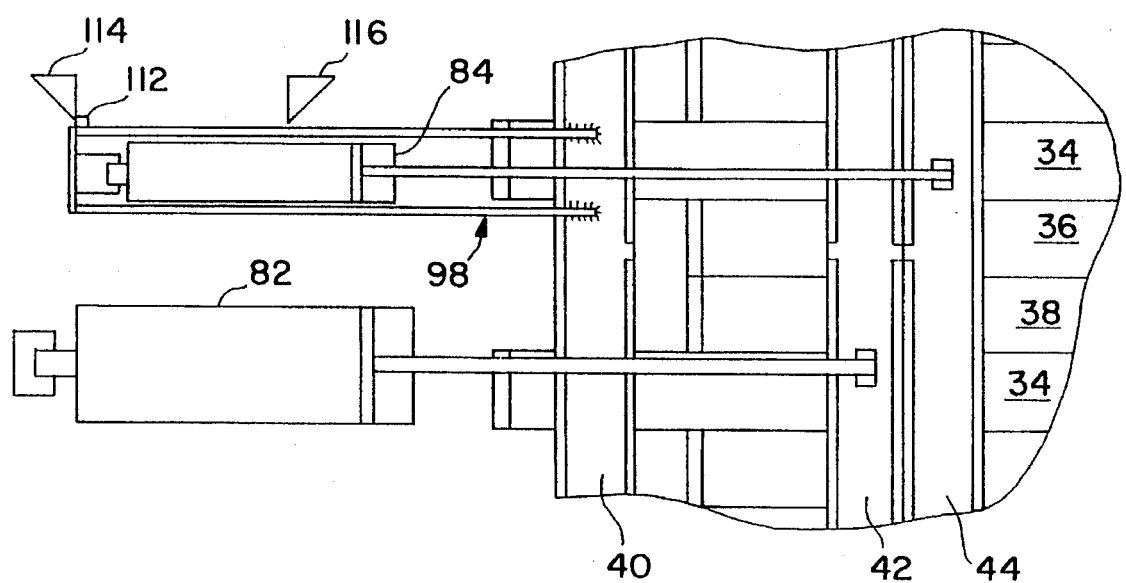
Figure 6C:
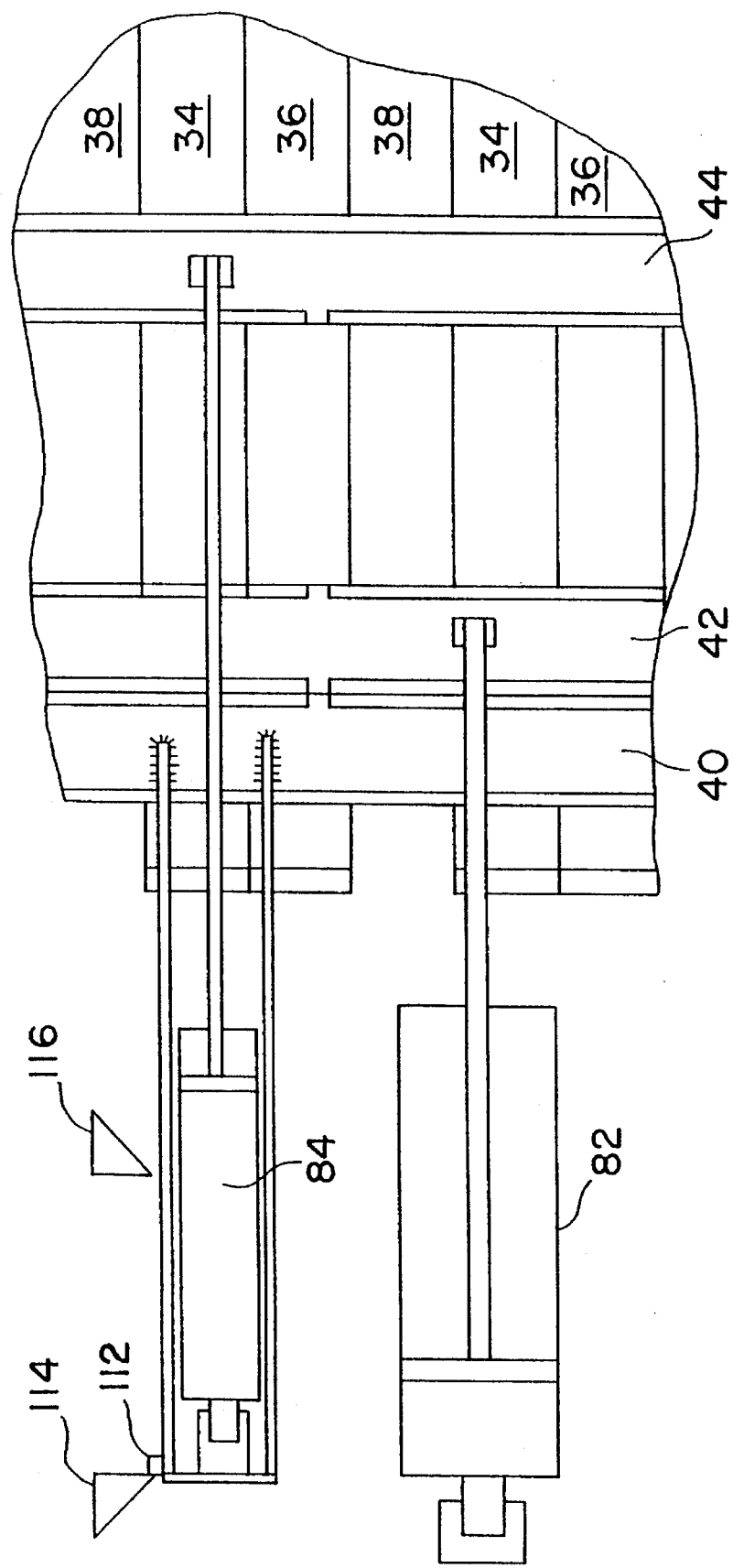

Upon extension of cylinder 84, pressure builds and sequencing valve 142 opens to flow hydraulic fluid into the front end of the body of cylinder 82, thereby extending the cylinder and moving cross member 42 and attached slats 36 rearwardly to the position of FIG. 6b. During this movement, the load on the conveyor is maintained stationary on stationary slats 34 and 38.

When cylinder 82 is fully extended, the pad 154 on arm 150 shifts valve 140 to flow hydraulic fluid to the rear end of the body of cylinder 84, thereby retracting cylinder 84 and moving the front cross member 40 and attached slats 34 rearwardly. The extended cylinder 82 holds cross member 42 in place and member 42, in turn, holds cross member 44 in place during retraction of cylinder 84 until abutment 110 engages rear stop 116 and the cross members, cylinders and slats are moved to the position shown in FIG. 6a. When this position has been reached and all of the slats have been moved rearwardly, pressure builds, sequencing valve 144 opens and hydraulic fluid is flowed into the rear end of the body of cylinder 82 to retract the cylinder. Retraction of cylinder 82 moves the middle cross member 42 to the front of the receptacle and engages and also moves the front cross member 40 to the front of the receptacle. During this time, cylinder 84 is held in the retracted position and the members 40 and 44 are connected so that movement of cross member 40 also moves cross member 44 toward the front of the receptacle. In this way, retraction of cylinder 82 moves all of the slats 34, 36, and 38 in the forward direction to move the cargo forward and return the conveyor to the start position illustrated in FIG. 5. When cylinder 82 is fully retracted, the pad on arm 152 shifts valve 140 to initiate the next loading cycle of operation of conveyor 10. Continued cycling of the conveyor moves a cargo placed on the slats at the rear end of the receptacle toward the front end of the receptacle, enabling ready loading of the entire receptacle.

Second Preferred Embodiment of the Invention

Figure 7:
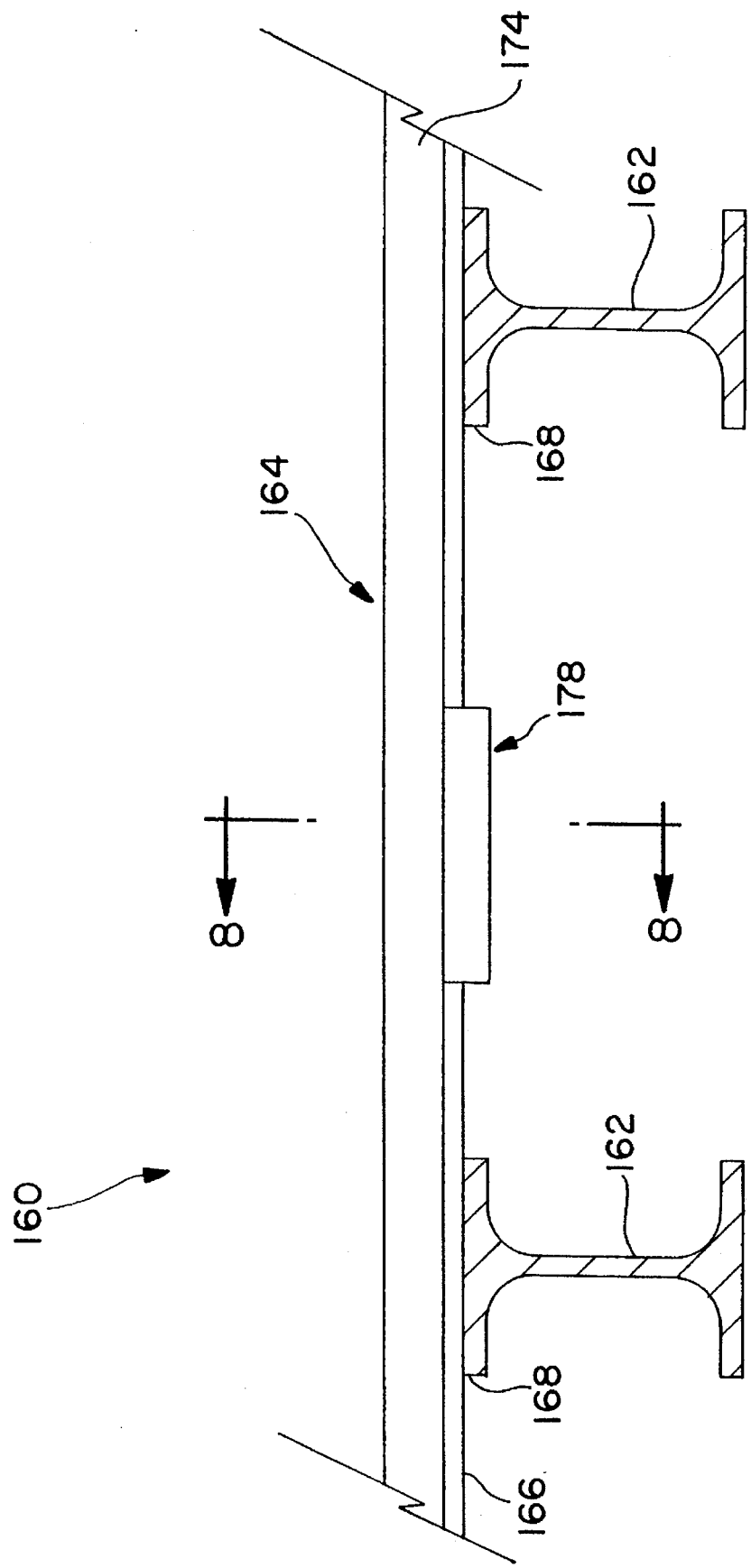
FIG. 7 is a longitudinal sectional view taken between adjacent conveyor slats of a second embodiment slat conveyor showing a hold down member.
Figure 8:
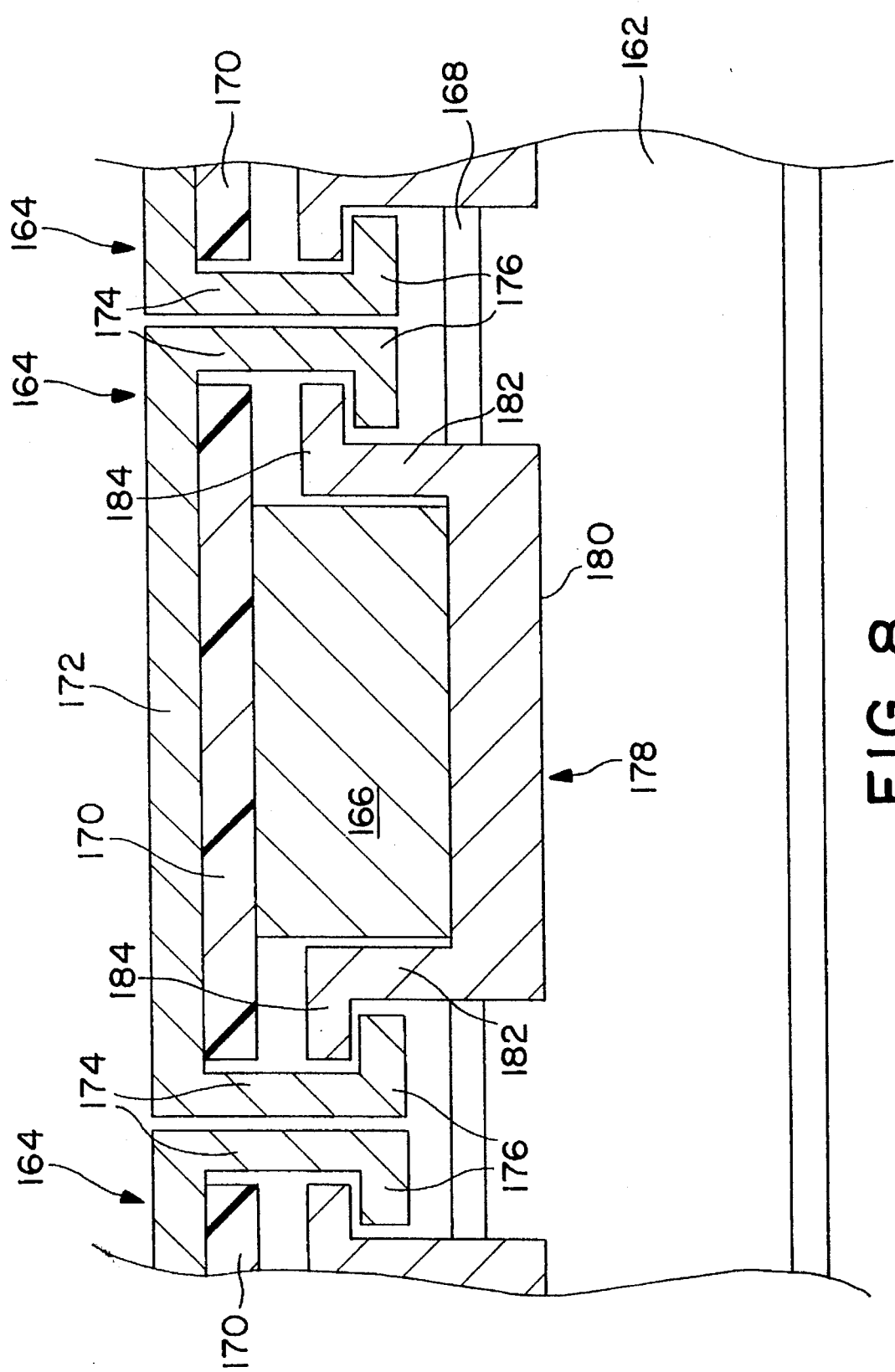
FIG. 8 is a sectional view taken along line 8—8 of FIG. 7.

FIGS. 7 and 8 illustrate a second preferred embodiment slat conveyor 160 like the first embodiment conveyor 10 but with specialized slats. The conveyor 160 includes a cargo receptacle like receptacle 12 having a plurality of support beams 162 extending laterally across the bottom of the receptacle like beams 28. A plurality of elongate slats 164 are supported by the beams and extend longitudinally along the length of the floor of the receptacle, like slats 32 of conveyor 10. The slats 164 are divided into three groups with each group being connected to a cross member extending across the front ends of the slats as in conveyor 10. A two cylinder hydraulic drive, like drive 16, operates conveyor 160 like conveyor 10 to either discharge a cargo from the cargo receptacle or load cargo into the receptacle.

Each slat 164 rests on an elongate support member 166 having a rectangular cross section as shown in FIG. 8 and extending along the length of the slat. Member 166 is preferably formed from metal and may be channel-shaped or tubular, if desired. The member rests flush on the top flanges 168 of the support beams 162. An elongate low friction plastic wear plate 170 rests on the top of the member 166 and also extends along the length of the slat 164. As shown in FIG. 8, plate 170 is wider than the beam and includes edges extending laterally beyond the sides of the beam.

Slats 164 are channel-shaped in transverse cross section and include a flat support plate 172 overlying wear plate 170, and a pair of dependent sides 174 extending downwardly from the lateral edges of plate 172 a distance beyond the wear plate 170 to inwardly extending flanges 176. The ends of flanges 176 are spaced a distance outwardly of the sides of member 166. Sides 174 of adjacent slats 164 are located closely adjacent to each other to limit cargo from becoming trapped between the slats and to provide full support for the cargo in the receptacle. The three cross members at the front end of the receptacle are connected to the front ends of the slats 164 and move the slats longitudinally back and forth along the receptacle. The low friction wear plates 170 facilitate movement of the slats relative to the members 166, which are held against longitudinal movement.

The slats 164 and wear plates 170 are easily mounted on members 166 or beams 162 by first positioning the wear plates in the slats and then placing the lead ends of the slats on the rear ends of the members. The slats and wear plates are then slid forward into the receptacle. During loading of the slats and beams, U-shaped hold down members 178 are mounted on the slat flanges 176 and extend under the members 166 as shown in FIG. 8. These members are loosely confined on the slats between adjacent pairs of support beams as shown in FIG. 7.

Hold down members 178 include a lower plate 180 having a width greater than the width of member 166, a pair of upstanding sides 182 extending upwardly from the edges of plate 180 between the sides of member 166 and flat flanges 176 and outwardly extending flanges 184 on the upper ends of sides 182. Flanges 184 extend over the slat flanges 176 to confine each hold down member in place between the slat 164 and beam 166. The loosely fitted hold down members serve to prevent lifting of the slats 164 above the members 166 during loading or unloading of the cargo receptacle.

Hold down members are easily positioned on the slats during insertion of the slats onto the receptacle floor, as previously described. In practice, the hold down members may shift slightly forwardly or rearwardly between the adjacent two support beams 162 during operation of conveyor 160. This movement does not affect the operation of the conveyor or the ability of the hold down members to prevent lifting of the individual slats 164.

Third Preferred Embodiment of the Invention

Figure 9:
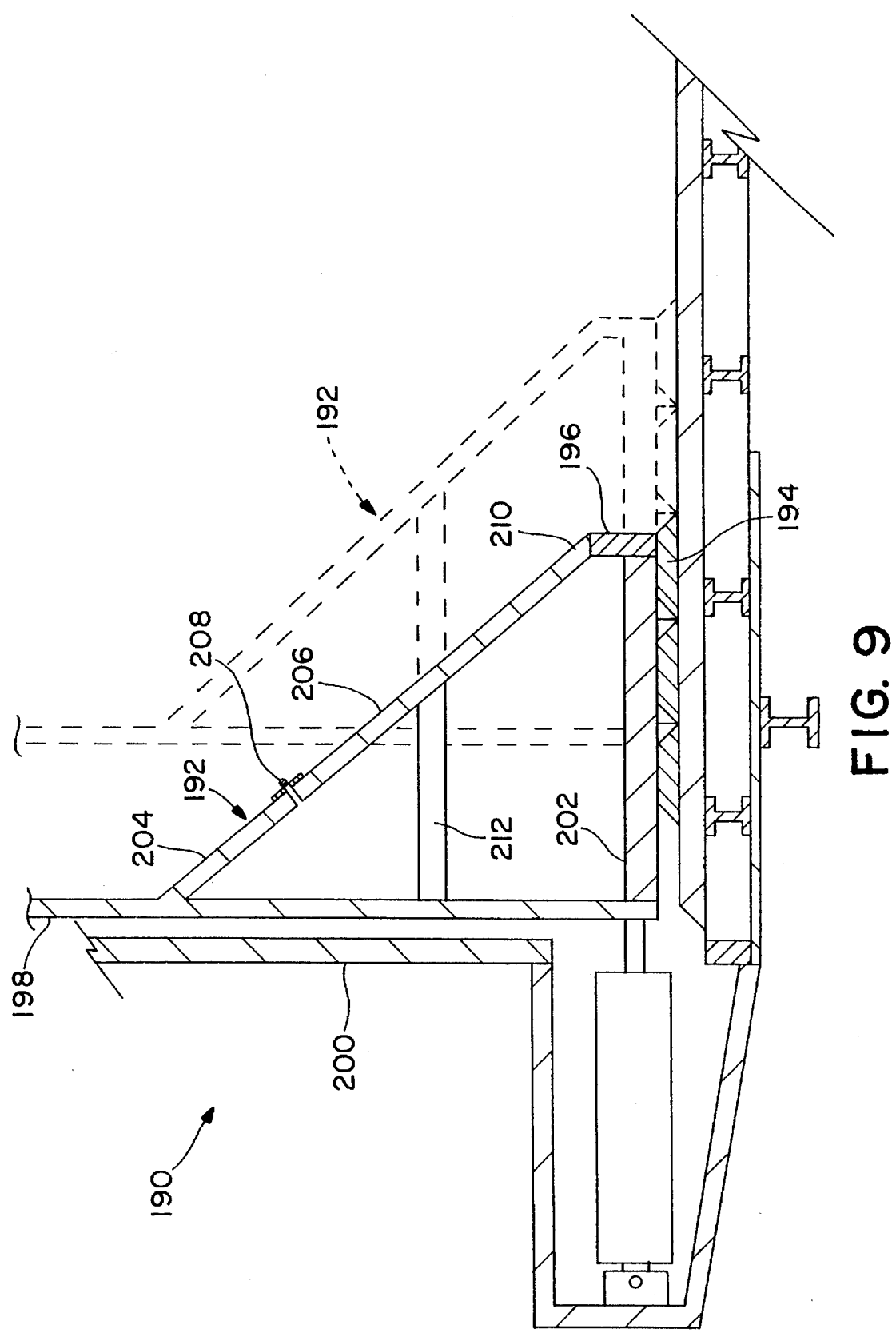
FIG. 9 is a sectional view similar to the view of FIG. 2 illustrating a third embodiment slat conveyor having a bulkhead movable with the rear cross member.

FIG. 9 illustrates a third preferred embodiment slat conveyor 190 which is like the first preferred embodiment slat conveyor 10 with the exception that a movable diagonal bulkhead 192 and front wall 198 are secured to the top of rear cross member 194, which corresponds to rear cross member 42 of conveyor 10, and are movable with the cross member 194 during operation of slat conveyor 190. The drive and slat movement of the third embodiment slat conveyor 190 are the same as the drive and slat movement of slat conveyor 10.

Bulkhead 192 extends across the width of the receptacle compartment and is secured to the top of cross member 194 by brackets or other conventional connection members on rear wall 196. The bulkhead includes short rear wall 196 above cross member 194 and a sloping plate 204 having an upper end joined to movable front wall 198 and extending downwardly from the front wall into the receptacle compartment. The lower end of the sloping plate is joined to the top of rear wall 196. The plate 204 includes an access door 206 which is connected to the upper part of the bulkhead by hinge 208. Door 206 is like door 64 and is rotatable about the hinge to access the area behind the bulkhead. The lower edge 210 of door 206 engages the top of the rear wall 190 when the door is closed. Openings are provided in the bottom of front wall 198 to permit extension and retraction of the two drive cylinders into the area under the bulkhead. A horizontal support arm 212 is secured to the interior side of bulkhead front wall 198 and has a free end with a sloped face adapted to support the interior side of bulkhead door 206 when closed. Receptacle wall 200 is located adjacent front wall 198.

During operation of the third embodiment slat conveyor 190 the bulkhead and front wall 198 are moved rearwardly from the front of the compartment with the rear cross member 194 to positively move cargo in the front of the compartment rearwardly while shielding cross members and drive 16 from cargo in the compartment.

Fourth Preferred Embodiment of the Invention

Figure 10:
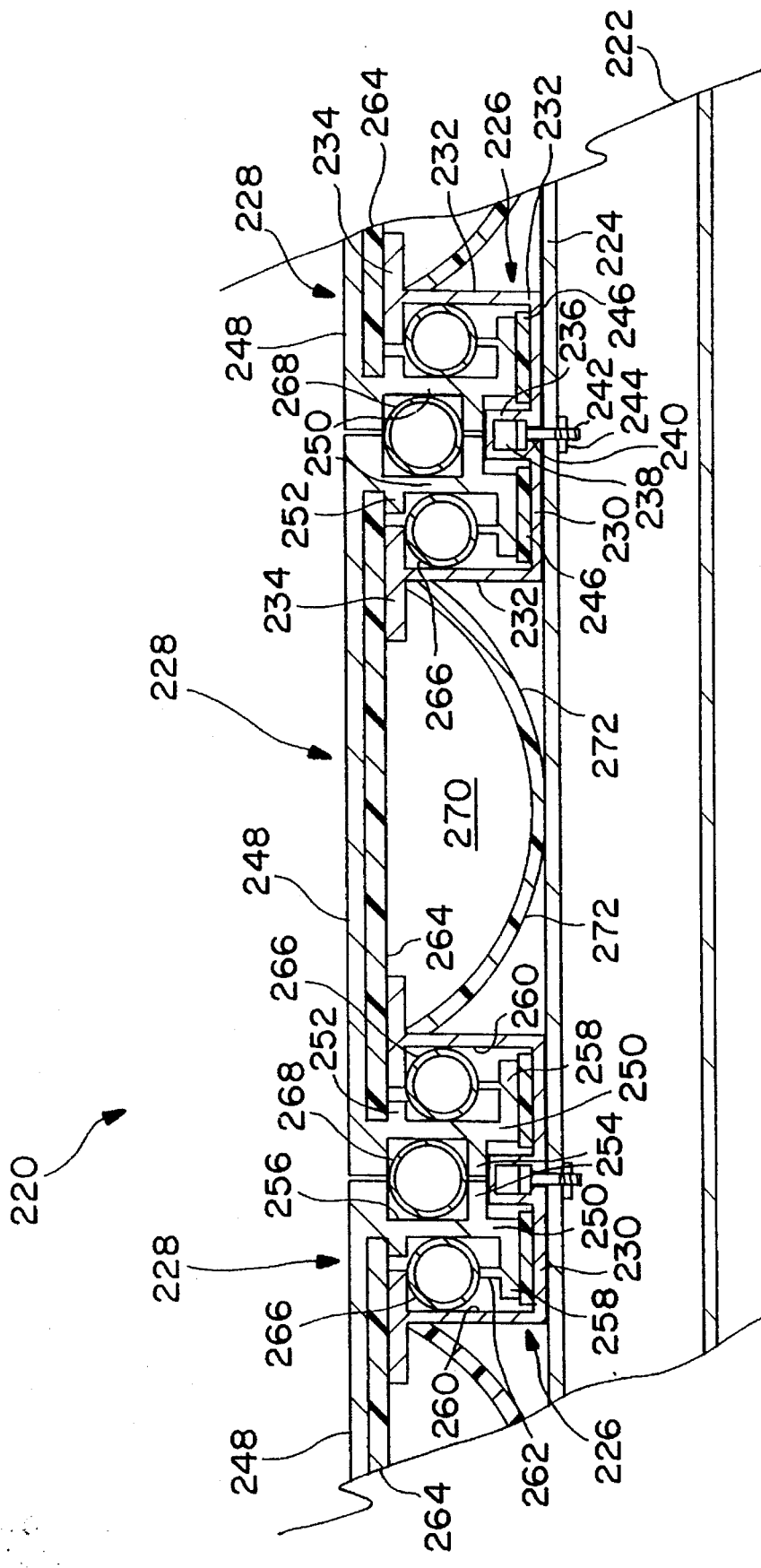
FIG. 10 is a transverse sectional view taken across the width of a number of slats illustrating a fourth embodiment of the invention.

FIG. 10 illustrates a fourth preferred embodiment reciprocating slat conveyor 220 including cross members, hydraulic drive, receptacle and floor like corresponding members of conveyor 10 as previously described but with different slats and support members for the slats.

Reciprocating slat conveyor 220 includes a number of spaced support beams 222 extending across the width of the receptacle floor and spaced at intervals along the length of the receptacle, like beams 28 of conveyor 10. The beams include upper flanges 224. A plurality of U-shaped slat support members 226 extend along the length of the receptacle floor and are spaced across the width of the floor so that each member supports one edge of longitudinally extending slats 228.

Each support member includes a base plate 230, a pair of upstanding sidewalls 232 extending upwardly from the edges of plate 230 and a pair of support flanges 234 located on the tops of the sidewalls 232 and extending to either side of the sidewalls. The base plate includes a box member 236 defining a longitudinally extending recess 238 opening through the base plate at a narrow slot 240 smaller than the width of the recess.

The support members 226 are secured to the upper flanges 224 of cross beams 222 by bolts 242. During mounting of the support members on the beams, the heads of the bolts are fitted tightly within the recesses 238 at spaced locations along the recesses with the shanks of the bolts extending down through the narrow slots. The bolt shanks are then fitted into holes formed in flanges 234. Nuts 244 are threadably engaged on the free ends of the bolt shanks extending below the flanges as shown in FIG. 10 to secure the cross members in place on beams 222. During tightening of the nuts, the close sliding fits between flats on the heads of the bolts and the sides of the recesses 238 prevent rotation of the bolts. The bolts are easily moved along the recesses 238 to proper spacing to fit the holes in the flanges 224.

Low friction plastic wear plates 246 rest on the top of the base plate 230 between the box member 236 and sidewalls 232. The plates extend the length of the slat support members 226.

Slats 228 each include a flat support plate 248 extending across the width of the slat and a pair of downwardly extending sidewalls 250 located a distance inwardly from the edges of plate 248. Short wear plate flange 252 extends inwardly from each sidewall 250 a short distance below support plate 248. A seal retention flange 254 extends outwardly from each sidewall 250 and cooperates with the overlying upper edge of support plate 248 when slats 228 are positioned side-by-side as shown in FIG. 10 to define a square recess 256 extending along the full length of the slats.

Flanges 258 extend inwardly from the lower ends of sidewalls 250 and cooperate with the adjacent flanges 252, inner ends of support flanges 234 on the support members and member sidewalls 232 and 252 to define a seal recess 260 extending along the length of the slats. A rib 262 extends upwardly from flange 258 into recess 260.

The support members 226 and slats 228 are preferably formed of metal extrusions and have uniform transverse cross sections.

Reciprocating slat conveyor 220 is assembled on cross beams 222 by first mounting the support members 226 on the beams as previously described and placing wear plates 246 on either side of base plate 230 as illustrated. Wide low friction plastic wear plates 264 are inserted under the support plates 248 of slats 228 as illustrated with the edges of the wear plates extending into recesses between flanges 252 and plates 248. The slats 228 are then extended into the previously mounted support members as illustrated with support flanges 234 engaging the lower surfaces of the outer edges of the wear plates 264 and flanges 258 resting on the top surfaces of wear plates 246.

Elongate tubular resilient seals 266 are inserted into each elongate seal recess 260 and extend along the full length of the slats. Similar elongate resilient tubular seals 268 are inserted into each elongate seal recess 256 and extend along the full length of the slats. The seals are resiliently deformed when inserted and form tight seals against the abutting surfaces of the slats and support members to prevent leakage of liquid down from the receptacle floor and through the slats. The seals permit longitudinal movement of the slats relative to the support members and each other during operation of the slat conveyor as described in connection with the description of the first embodiment slat conveyor 10.

Specifically, tube seals 268 prevent flow of liquid collecting on the tops of slats 228 down between the sidewalls of the slats. Tube seals 266 also prevent flow of any liquid passing seals 268 from flowing up past the support flanges 234 and plate 264 into the space 270 between adjacent support members 226. The support members 226 are preferably longer than the slats 228 and may be closed at their ends to prevent liquid from flowing out of the ends of the members.

Resilient troughs 272 are inserted in spaces 270 and extend along the length of the conveyor. Troughs are formed from resilient flat sheet material, which may be plastic, and include side edges fitted in the upper corners at the intersections of the support member sidewalls 232 and flanges 234. The troughs are located on the upper flanges 224 and are supported by the flanges. See FIG. 10. Troughs collect any liquid which may leak past the seals 268 and 266 and into interior 270 and channel the liquid to the rear of the conveyor for suitable discharge. The troughs and seals prevent liquid draining down from the receptacle cargo from falling through the bottom of the conveyor and facilitate compliance with government environmental standards.

The conveyor 220 has been described with support members 226 mounted on cross beams 222. Alternatively, a sheet metal floor may close the interior of the receptacle with the support members 226 mounted directly on top of the floor in the same way as described in connection with mounting of the support members on the upper beam flanges 224. In this application, any liquid flowing past the tube seals 268 and 266 is collected on the floor and would flow to the rear of the receptacle for collection as required and collection troughs 272 are not required.

Fifth Preferred Embodiment of the Invention

Figure 11:
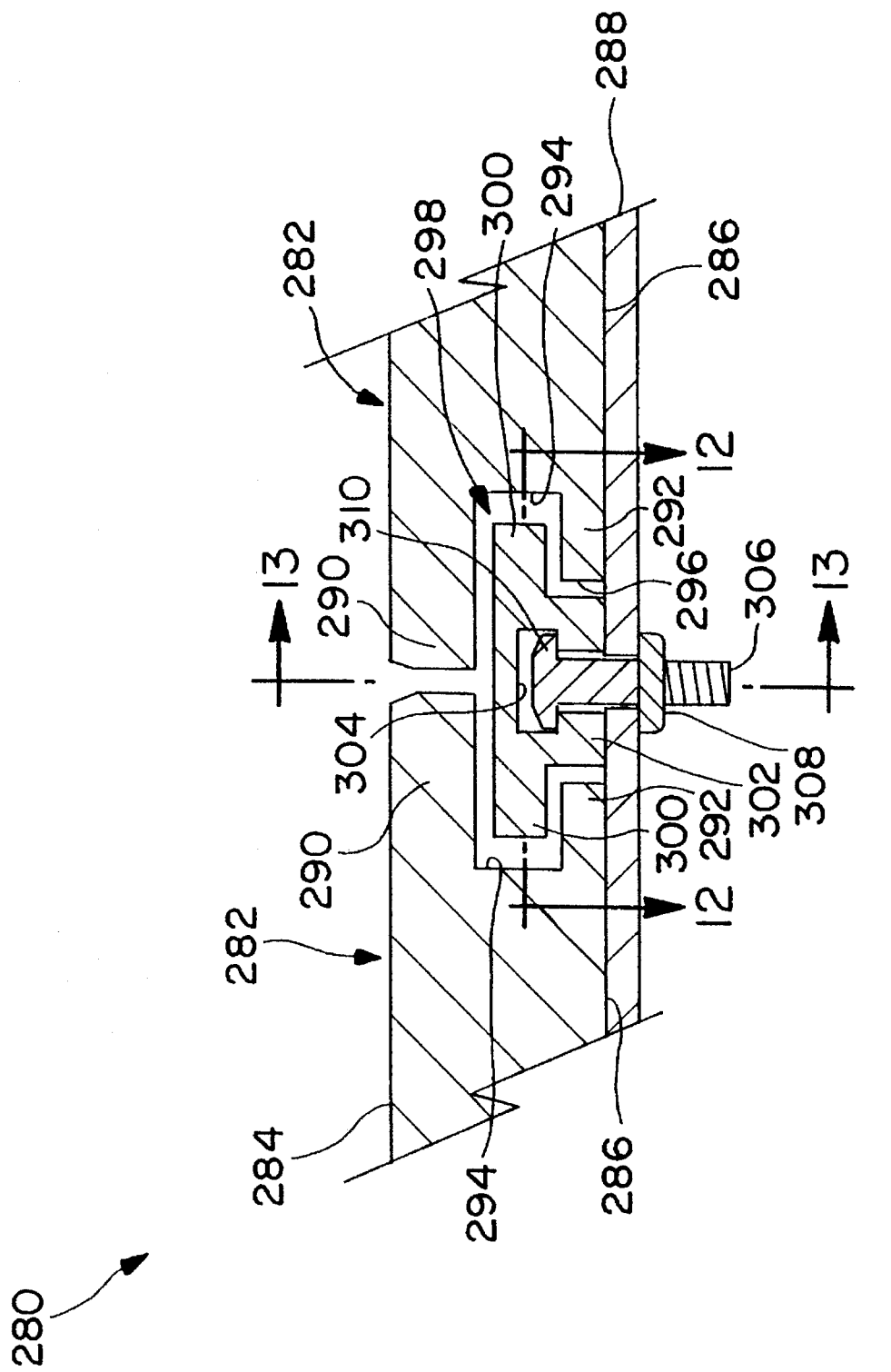
FIG. 11 is a sectional view similar to the view of FIG. 10 illustrating a fifth embodiment of the invention.
Figure 12:
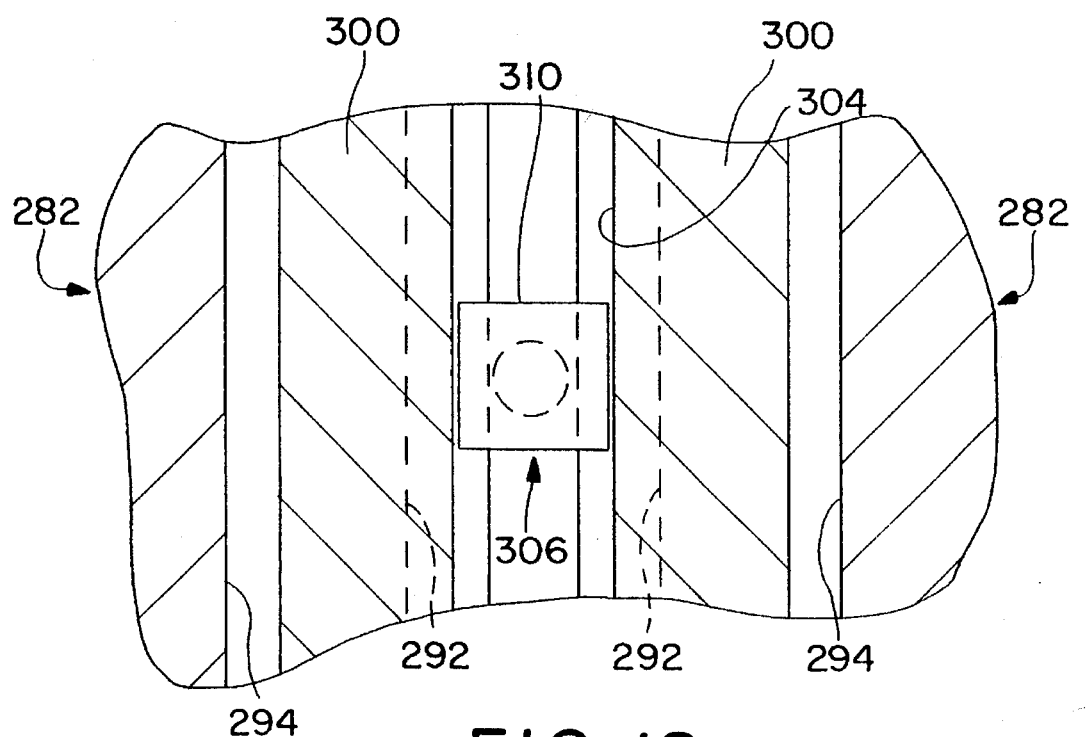
FIG. 12 is a sectional view taken along line 12—12 of FIG. 11.
Figure 13:
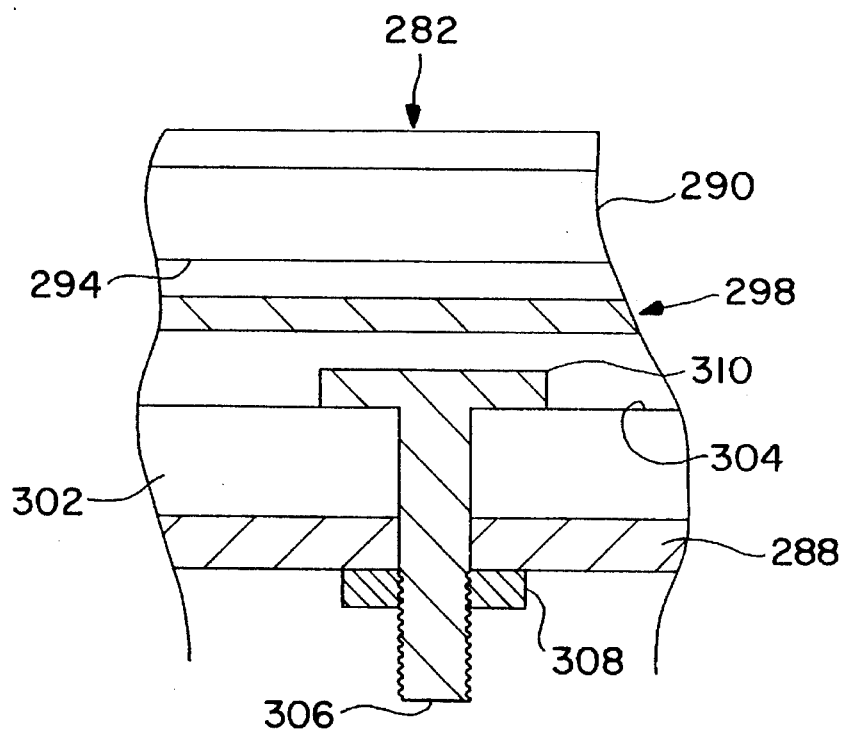
FIG. 13 is a sectional view taken along line 13—13 of FIG. 11.

FIGS. 11, 12 and 13 illustrate a fifth embodiment reciprocating slat conveyor 280 having a receptacle, two cylinder hydraulic drive and a plurality of load supporting slats on the floor of the receptacle like first embodiment conveyor 10. The slats 282 of conveyor 280 extend the length of the floor and have a uniform transverse cross section as illustrated in FIG. 11. Slats 282 may be formed from metal extrusions or from an extruded or formed plastic material. The slats include an upwardly facing load supporting surface 284 and a lower support surface 286 which rests upon transversely extending support member 288 or upon a solid floor. Member 288 may be the top flanges of extending support beams, similar to beams 28 in conveyor 10 or may be a plate extending completely across the floor of the receptacle. Slats 282 are connected to cross members or a solid floor extending across the width of the receptacle at the front end with the cross members connected to the two cylinder drive, as previously described. The drive reciprocates the slats to move a load either forwardly or rearwardly along the receptacle, as required.

Each slat 282 includes flange 290 adjacent the upper support surface 284 defining the lateral edge of the slat. A recessed flange 292 extends along each lower edge of the slat to define a recess 294 between the two flanges 290 and 292. The flanges 292 of adjacent slats 282 are spaced apart to define a slot 296 extending along the length of the conveyor between adjacent pairs of slats.

Elongate slat hold down members 298 are mounted on support member 288 by nut and bolt connections as illustrated. The hold down members 298 are generally T-shaped in transverse cross section with arms 300 extending into the recesses 294 formed in the thickness of the adjacent slats. As illustrated in FIG. 11, the members 298 include a base 302 extending downwardly from arms 300 and resting flush on the member 288. An elongate T-shaped recess 304 is formed in hold down member base 302 and extends along the length of the member.

Members 298 are secured on the support member 288 by freely positioning bolts 306 in the T-recess or slot 304 with the shanks of the bolts extending outwardly of the recesses below the base and through holes formed in the support member 288. Nuts 308 are secured to the threaded shanks to secure the slat support members 298 in place on member 288. The bolts are freely movable along the length of the T-recesses 304 to conform to the location of the holes in the support member 288. The heads of the bolts have flats which engage the sides of the T-recesses to prevent rotation of the bolts during tightening down of nuts 308 in order to secure the support members in place.

As illustrated in FIG. 11, the hold down members orient the adjacent slats 282 in place on the support members 288. The arms 300 extend into slots 294 and overlie flanges 292 to prevent lifting of the slats above the support members 288.

Sixth Preferred Embodiment of the Invention

Figure 14:
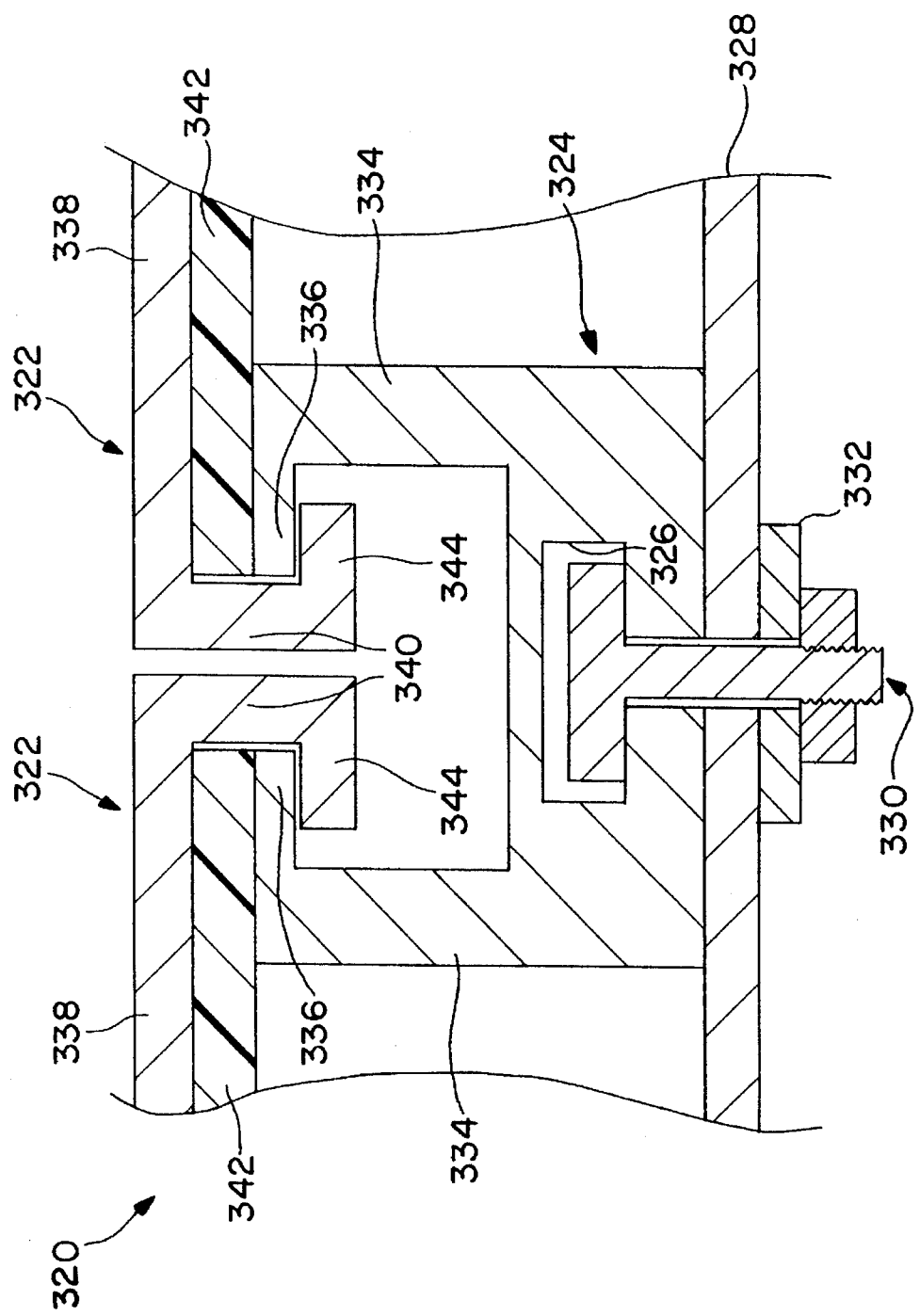
FIG. 14 is a sectional view similar to the views of FIGS. 10 and 11 illustrating a sixth embodiment of the invention.

FIG. 14 illustrates sixth embodiment reciprocating slat conveyor 320 with components identical to the components of first embodiment conveyor 10 with the exception of the disclosed slats 322 and slat hold down members 324. The slats 322 extend along the length of the conveyor floor with hold down members 324 likewise extending along the length of the floor. The hold down members include longitudinally extending T-recesses 326 opening in the bottom of the members to facilitate mounting the members on a support member 326, like member 288 of the embodiment shown in FIG. 11. Nut and bolt connections 330, like the nut and bolt connections used to hold the slat support members 298 in place in the embodiment shown in FIGS. 11–13, are used to secure support member 324 in place on support 328. The bolt of connection 330 is freely movable along the T-slot 326 to permit ready location of the bolt to extend through a preformed hole in the support 328. If desired, the nut and bolt connection may include a washer 332 between the nut and the support 328.

Slat support member 328 is similar to slat support member 298 but includes upwardly extending side arms 334 and inwardly extending flanges 336 on the ends of the arms. The slats 322 include support plates 338 extending across the full width of the slats and downwardly extending end walls 340. Inwardly extending flanges 344 extend inwardly from the lower ends of walls 340 under flanges 336. Low friction plastic wear plates 342 extend underneath support plates 338 and overlie the tops of the support member sidewalls 334 and flanges 336. The plates permit low friction extension and retraction of the slats 322 by the slat drive. The slats 322 are held in place on the support members by flanges 344 which extend under support members flanges 336 to prevent lifting of the slats during operation of the conveyor.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A reciprocating slat conveyor comprising:
   a) a body having a front end, a rear end and sidewalls;
   b) a plurality of elongate load-supporting slats having front ends and rear ends on the body and extending longitudinally along the body, said slat front ends being adjacent the front end of the body and said slat rear ends being adjacent the rear end of the body, said slats being arranged side-by-side in a number of sets of spaced apart slats;
   c) a number of cross members arranged side-by-side on and extending across the front ends of the slats with a first cross member positioned nearest to the front end of the body and a second cross member positioned furthest from the front end of the body; and a number of sets of connections, each set of connections joining one cross member to one set of slats for longitudinal movement therewith;
   d) a slat drive at the front end of the body including drive connections joined to the cross members;
   e) a front wall extending between the sidewalls; and
   f) a bulkhead at the front end of the body extending between the sidewalls, the bulkhead including a lower portion adjacent to said second cross member, an upper portion joined to the front wall and located closer to the front of the body than the lower portion and above the lower portion, and an intermediate portion extending from the lower portion to the upper portion, the intermediate portion overlying said first cross member and said drive connections, said bulkhead and front wall closing the front of the body.

2. A conveyor as in claim 1 wherein said intermediate portion is flat and extends upwardly at an angle from the lower portion to the upper portion.

3. A conveyor as in claim 2 including a port in the intermediate portion and a closure for the port.

4. A conveyor as in claim 1 wherein said entire bulkhead and front wall are joined to said second cross member and move with such cross member.

5. A conveyor as in claim 1 wherein said front wall is fixed to said body and immovable, said upper portion is joined to the front wall, and including a rear flange joined to said second cross member, a coverplate extending from the rear flange toward the front end of the body above the cross members, and a slide connection between the lower end of the intermediate portion and the coverplate.

6. A conveyor as in claim 5 wherein said lower portion of the bulkhead includes a wear member engagable with said coverplate.

7. A conveyor as in claim 5 wherein the coverplate includes an upwardly extending front flange.

8. A conveyor as in claim 5 wherein the intermediate portion includes an access opening and a door closing the opening.

9. A conveyor as in claim 1 wherein said slat drive comprises a plurality of hydraulic cylinders, and cylinder connections joining said cylinders to the front end of the body, said drive connections extending over the front ends of the slats and joining said cylinders to the cross members under the bulkhead.

10. A reciprocating slat conveyor comprising:

a) a body having a front end, a rear end and sidewalls;

b) a plurality of elongate load-supporting slats having front ends and rear ends on the body and extending longitudinally along the body, said slat front ends being adjacent the front end of the body and said slat rear ends being adjacent the rear end of the body, said slats being arranged side-by-side in a number of sets of spaced apart slats;

c) a number of cross members arranged side-by-side on and extending across the front ends of the slats with a first cross member positioned nearest to the front end of the body and a second cross member positioned furthest from the front end of the body; and a number of sets of connections, each set of connections joining one cross member to one set of slats for longitudinal movement therewith;

d) a slat drive including drive connections joined to the cross members;

e) a fixed front wall extending between the sidewalls; and f) a bulkhead at the front end of the body extending between the sidewalls, the bulkhead including an upper portion, a mechanical connection joining the upper portion to the front wall above the slats, an intermediate portion extending downwardly and rearwardly from the upper portion and a lower portion; a coverplate member joined to said second cross member and extending toward the front of the body from the second cross member above the cross members, and a slide connection between the lower portion of the bulkhead and the coverplate member, the bulkhead and front wall closing the front of the body.

11. A conveyor as in claim 10 including a wear member at said slide connection.

12. A conveyor as in claim 10 including a port in the bulkhead and a closure for the port.

13. A conveyor as in claim 10 wherein said slat drive is located at the front end of the body and said drive connections engage the cross members.

14. A conveyor as in claim 10 wherein said coverplate member includes an upwardly extending front flange and a downwardly extending rear flange engaging said second cross member.

* * * * *